(12) United States Patent
Keni

(10) Patent No.: US 11,403,720 B2
(45) Date of Patent: Aug. 2, 2022

(54) SYSTEM, METHOD AND COMPUTER PROGRAM PRODUCT OF WATER MANAGEMENT CONTROL

(71) Applicant: Atharva Deepak Keni, Woodbridge, NJ (US)

(72) Inventor: Atharva Deepak Keni, Woodbridge, NJ (US)

( * ) Notice: Subject to any disclaimer, the term of this patent is extended or adjusted under 35 U.S.C. 154(b) by 136 days.

(21) Appl. No.: 16/805,704

(22) Filed: Feb. 29, 2020

(65) Prior Publication Data
US 2020/0219208 A1    Jul. 9, 2020

(51) Int. Cl.
| | |
|---|---|
| *G06Q 50/06* | (2012.01) |
| *G06Q 50/16* | (2012.01) |
| *F24F 11/00* | (2018.01) |
| *G05B 15/02* | (2006.01) |
| *G06Q 10/04* | (2012.01) |

(52) U.S. Cl.
CPC .......... *G06Q 50/06* (2013.01); *F24F 11/0008* (2013.01); *G05B 15/02* (2013.01); *G06Q 10/04* (2013.01); *G06Q 50/163* (2013.01)

(58) Field of Classification Search
None
See application file for complete search history.

(56) References Cited

U.S. PATENT DOCUMENTS

| | | | | |
|---|---|---|---|---|
| 2005/0197847 | A1* | 9/2005 | Smith ................... | G06Q 10/06 705/39 |
| 2006/0168611 | A1* | 7/2006 | Fima .................. | G01M 3/2815 725/10 |
| 2012/0259466 | A1* | 10/2012 | Ray ........................ | G05B 15/02 700/275 |
| 2013/0116994 | A1* | 5/2013 | Abbott Donnelly ... | G06Q 50/06 703/6 |
| 2013/0274940 | A1* | 10/2013 | Wei ........................ | G06Q 50/06 700/291 |
| 2017/0235317 | A1* | 8/2017 | Cummings .......... | G05D 7/0617 700/282 |
| 2018/0305906 | A1* | 10/2018 | Abdel-Fattah .......... | E03B 7/078 |

\* cited by examiner

*Primary Examiner* — Ryan D. Coyer

(57) ABSTRACT

A system, method and computer program product of managing, monitoring and controlling water consumption in a building, apartment, home or dwelling includes receiving occupancy data including at least one of occupant request data and occupant schedule data, receiving weather data and/or external ambient climate data including at least one of current weather measurement data and weather forecast data, generating an output control signal based on the occupancy data and the weather data, the external ambient climate data, and transmitting the output control signal to a building, apartment, home or dwelling automation system (FAS) of the building, apartment, home or dwelling. The occupant request data includes a current request, and the occupant schedule data includes a predicted occupant schedule. The output control signal adjusts a building, apartment, home or dwelling control device in a zone in the building, apartment, home or dwelling.

18 Claims, 6 Drawing Sheets

SYSTEM, METHOD AND COMPUTER PROGRAM PRODUCT OF WATER MANAGEMENT CONTROL

BACKGROUND

1. Technical Field

The present disclosure relates to water management control, and more particularly, to water management control framework of optimization control and operation for water efficient building, apartment, home or dwellings.

2. Discussion of Related Art

Building, apartment, home or dwelling control and operation is shifting from reactive control strategies to proactive control strategies. The water performance of a building, apartment, home or dwelling may be affected by dynamic disturbances evolving at different time scales. These disturbances include, for example, water load demands, water prices, and weather conditions.

Building, apartment, home or dwelling control and operation may be proactively managed using a building, apartment, home or dwelling automation system (FAS). A FAS is a system used by the control system of a building, apartment, home or dwelling to monitor and control various systems (e.g., mechanical, electronics, and humidifying systems) in the building, apartment, home or dwelling. For example, a FAS may be used to keep the humidity in the building, apartment, home or dwelling within a specified range, turn humidifying systems on or off during certain times, etc. A FAS generally operates according to a fixed schedule, maximum occupancy assumptions, and fixed occupant comfort ranges at all times, and does not utilize all available information when managing water consumption in a building, apartment, home or dwelling.

BRIEF SUMMARY

According to an exemplary embodiment of the present disclosure, a method of managing, monitoring and controlling water consumption in a building, apartment, home or dwelling includes receiving occupancy data including at least one of occupant request data and occupant schedule data. The occupant request data may include a current request, and the occupant schedule data may include a predicted occupant schedule. The method further includes receiving weather data and/or external ambient climate data including at least one of current weather measurement data and weather forecast data, and generating an output control signal based on the occupancy data and the weather data and/or external ambient climate data. The output control signal is configured to adjust a building, apartment, home or dwelling control device in a zone in the building, apartment, home or dwelling. The method further includes transmitting the output control signal to a building, apartment, home or dwelling automation system (FAS) of the building, apartment, home or dwelling.

The method may further include receiving water price data comprising at least one of current water price data and predicted water price data. Generating the output control signal may further be based on the water price data.

The method may further include determining a peak water load time based on the water price data. The output control signal may further be configured to pre-humidify or pre-dehumidify the building, apartment, home or dwelling during a time that does not correspond to the peak water load time.

The method may further include receiving a facility management rule or user defined management rule. Generating the output control signal may further be based on the facility management rule or user defined management rule.

The method may further include generating a notification indicating that the current request does not comply with the facility management rule or user defined management rule upon determining that the current request does not comply with the facility management rule or user defined management rule, and transmitting the output control signal to the FAS upon determining that the current request complies with the facility management rule or user defined management rule, wherein the output control signal reflects the current request.

The method may further include transmitting the output control signal to the FAS upon determining that the current request does not comply with the facility management rule or user defined management rule, wherein the output control signal reflects a closest value relative to the current request that complies with the facility management rule or user defined management rule.

The zone may correspond to a room in the building, apartment, home or dwelling, or to an area in the building, apartment, home or dwelling including two or more rooms.

The output control signal may include a set-point corresponding to a target humidity, and the building, apartment, home or dwelling control device may be a humidity controlling thermostat.

The output control signal may include a set-point corresponding to a target humidity or air moisture content value, and the building, apartment, home or dwelling control device may be a humidifying system.

The method may further include setting a schedule for receiving at least one of the weather data, the external ambient climate data, occupancy data, the internal conditions (humidity, temperature, air quality and internal ambience) data, and the water price data.

At least one of the weather data, the external ambient climate data, occupancy data, the internal conditions (humidity, temperature, air quality and internal ambience) data, and the water price data may be received from a remote database or remote system capable of sensing data and transmitting data in real time (with or without need for storing data).

According to an exemplary embodiment of the present disclosure, a method of managing, monitoring and controlling water consumption in a building, apartment, home or dwelling includes receiving occupant request data including a plurality of requests. Each of the plurality of requests corresponds to one of a plurality of zones in the building, apartment, home or dwelling. The method further includes receiving occupant schedule data including a plurality of predicted occupant schedules. Each of the plurality of predicted occupant schedules corresponds to one of the plurality of zones in the building, apartment, home or dwelling. The method further includes receiving weather data and/or external ambient climate data including at least one of current weather measurement data and weather forecast data, and generating a plurality of output control signals. Each of the plurality of output control signals is based on one of the plurality of requests and one of the plurality of predicted occupant schedules, and each of the plurality of output control signals is configured to adjust building, apartment, home or dwelling control devices in the plurality of zones in the building, apartment, home or dwelling. The method further includes transmitting the output control signal to a building, apartment, home or dwelling automation system (FAS) of the building, apartment, home or dwelling.

According to an exemplary embodiment of the present disclosure, a water management controller includes a run-time module configured to receive occupant schedule data including a predicted occupant schedule, and weather data and/or external ambient climate data including at least one of current weather measurement data and weather forecast data. The controller further includes a human-machine interface (HMI) configured to receive occupant request data comprising a current request. The controller further includes an interface module configured to receive an output control signal from the run-time module and transmit the output control signal to a building, apartment, home or dwelling automation system (FAS) of a building, apartment, home or dwelling. The output control signal is based on the occupant schedule data, the weather data, the external ambient climate data, and the occupant request data, and the output control signal is configured to adjust a building, apartment, home or dwelling control device in a zone in the building, apartment, home or dwelling.

BRIEF DESCRIPTION OF THE SEVERAL VIEWS OF THE DRAWINGS

The above and other features of the present invention will become more apparent by describing in detail exemplary embodiments thereof with reference to the accompanying drawings, in which.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

According to exemplary embodiments of the present disclosure, a water management control (WMC) system is utilized to permit a building, apartment, home or dwelling automation system (FAS) to utilize different, externally available information to proactively control, and optimize water management. A FAS is a system used by the control system of a building, apartment, home or dwelling to monitor and control various systems in the building, apartment, home or dwelling. For example, a FAS communicates with building, apartment, home or dwelling control devices in the building, apartment, home or dwelling to manage the water consumption in the building, apartment, home or dwelling. The types of information utilized by the WMC system include, for example, weather information, occupancy information, and water market price information. By integrating this available, useful information, water consumption may be decreased, and occupant comfort may be increased in a building, apartment, home or dwelling.

Figure 1:
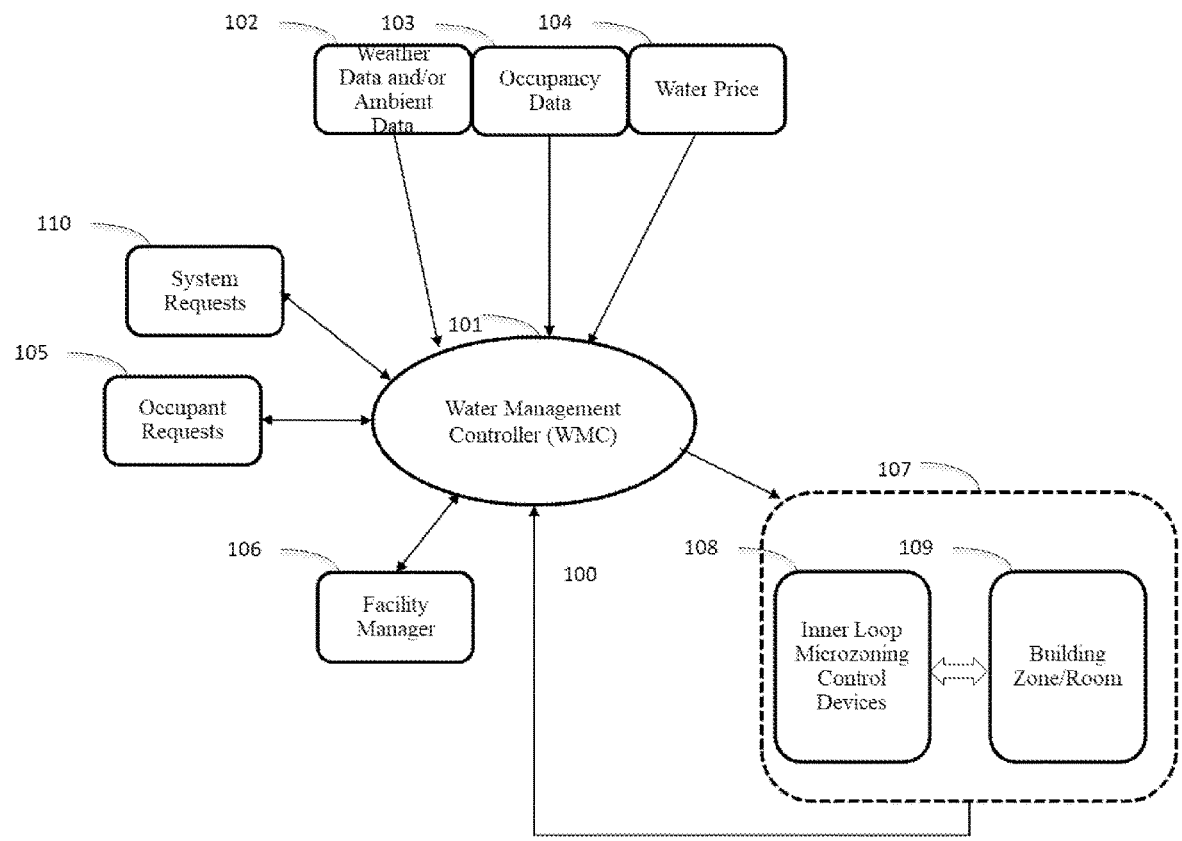
FIG. 1 shows a water management control (WMC) system, according to an exemplary embodiment of the present disclosure.

FIG. 1 shows a water management control (WMC) system 100, according to an exemplary embodiment of the present disclosure.

In FIG. 1, a water management controller 101 receives data, including, for example, weather data and/or external ambient climate data 102, occupancy data 103, and water price data 104. The weather data and/or external ambient climate data may include current weather measurement data (e.g., the current humidity) and weather forecast data (e.g., a prediction of the humidity over an upcoming time period). The occupancy data may include occupant request data and occupant schedule data. The occupant request data is data input by an occupant, and corresponds to a current request made by the occupant. For example, an occupant may request that the humidity in a zone in the building, apartment, home or dwelling be set to a specific humidity value. The occupant schedule data is data reflecting a predicted occupant schedule for a building, apartment, home or dwelling. For example, a building, apartment, home or dwelling may include different zones, and each zone may have corresponding occupant schedule data. The occupant schedule data may be based on a prediction of the number of occupants that will be present in certain zones of the building, apartment, home or dwelling at certain times, as well as certain tasks, which require certain levels of water consumption, that are scheduled to be performed in certain zones of the building, apartment, home or dwelling at certain times. Water price data may include current water price data (e.g., a real-time water price) and/or predicted water price data for future time periods. A zone in the building, apartment, home or dwelling may correspond to a single room in the building, apartment, home or dwelling, or to an area in the building, apartment, home or dwelling including several rooms.

The data may be input to the water management controller 101 via a variety of means, and is used by the WMC system 100 for optimal planning and operation of the FAS. For example, in an exemplary embodiment, the WMC system 100 may include input means such as, for example, a touchscreen, a keyboard, a mouse, etc., and a user can manually input the different types of data. In an exemplary embodiment, the WMC system 100 may retrieve the data from a database, or a plurality of databases. The database(s) may be located separately from the WMC system 100, and the WMC system 100 may communicate with the database(s) via a network connection (e.g., a wired connection or a wireless connection). The data may be received automatically or manually by a user. For example, a user may set a schedule regarding the frequency at which the data is retrieved. In addition, the WMC system 100 may receive occupant requests at block 105 and/or may receive requests at block 110 from a system (or mobile application system) that stores and manages information on occupant and occupant schedule including but not limited to occupant travel plans outside the building, apartment, home or dwelling; and rules from a facility manager at block 106. Based on the received data and input received from an occupant and/or a facility manager or received from a system (or mobile application system) that stores and manages information on occupant and occupant schedule including but not limited to occupant travel plans outside the building, apartment, home or dwelling, the WMC system 100 outputs control signals. The output control signals may include, for example, set-points of zone humidity, humidity, and humidity or air moisture content, and schedules of building, apartment, home or dwelling control devices such as, for example, a humidity controlling thermostat, HVAC (heating, ventilation and air conditioning), windows, and lights.

During operation, the WMC system 100 may implement a dual-loop structure. For example, the WMC system 100 may utilize an inner loop and an outer loop. The inner loop is shown at block 107 of FIG. 1, and enables micro-zoning and performs local optimization of the building, apartment, home or dwelling control devices (block 108) (e.g., HVAC, humidifying, windows, etc.) within the building, apartment, home or dwelling used to comply with the set-point requirements output by the WMC system 100. That is, the inner loop enables independent control of low level building, apartment, home or dwelling control devices (block 108) in individual zones in the building, apartment, home or dwelling (block 109). A zone in the building, apartment, home or dwelling may correspond to a single room in the building, apartment, home or dwelling, or to an area in the building, apartment, home or dwelling including several rooms. Micro-zoning refers to individually managing different building, apartment, home or dwelling control devices in different zones of the building, apartment, home or dwelling to optimize water consumption in the building, apartment, home or dwelling. A water consumption profile may be transmitted from the inner loop to the water management controller 101, allowing the water management controller 101 to make adjustments to the output control signal transmitted to the inner loop. The output control signal may include, for example, set-points, modes, and schedules. The outer loop functions as a control loop for the main framework of the WMC system 100, serving as a high level strategy planner, enabling the FAS to perform a variety of functions. For example, the outer loop may enable the FAS to utilize data including, for example, weather data and/or external ambient climate data 102, occupancy data 103, and water price data 104 to configure a water saving strategy and implement the strategy in real-time. The outer loop may further enable the FAS to exploit the building, apartment, home or dwelling's thermal storage capacity for water load shaping, coordinate occupants' real-time requests for micro-zoning, plan natural ventilation and cooling, and predict a daily water demand profile for automatic demand response. The outer loop communicates with the inner loop via an interface module 205, as described with reference to FIG. 2.

Figure 2:
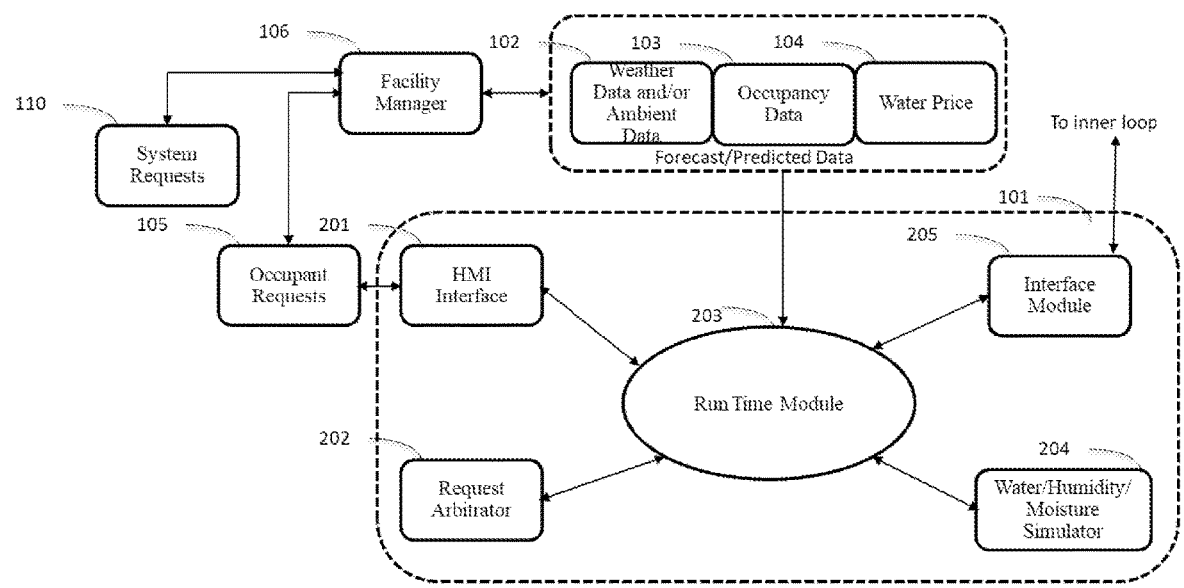
FIG. 2 shows the water management controller of FIG. 1, according to an exemplary embodiment of the present disclosure.

FIG. 2 shows the water management controller 101 of FIG. 1, according to an exemplary embodiment of the present disclosure.

As shown in FIG. 2, the water management controller 101 may include a number of components. A human-machine interface (HMI) 201 is utilized to communicate with occupants and the facility manager to receive requests (e.g., from the occupants) and rules (e.g., from the facility manager). The HMI 201 may aggregate the requests and rules to facilitate optimal planning and operation of the FAS. The HMI 201 may be implemented in a variety of manners. For example, the HMI 201 may be a dedicated web-based HMI, providing occupants with a convenient and easily accessible interface to control certain zones and rooms in the building, apartment, home or dwelling. The web-based HMI may be accessed via any network connected device including, for example, a computer, a tablet computer, a smartphone, etc. The HMI 201 may include the capability of storing task schedules and preferences associated with the tasks. The facility manager may utilize the HMI 201 to receive information relating to the occupants' preferences, task schedules, and demand response request (e.g., a request from a utility company to reduce water consumption during periods of high demand), allowing the facility manager to implement rules of operations and decisions during a demand response period (e.g., decreasing water consumption).

A request arbitrator 202 receives requests input by the occupant and rules input by the facility manager, and implements the requests based on the rules. The requests that comply with the rules may be implemented by the WMC system 100. For example, if a user inputs a request that a humidity in a zone of a building, apartment, home or dwelling be set to 35 percent, and the rules input by the facility manager specify that the humidity stay within a range of 36 percent and 78 percent, the request arbitrator 202 will not implement the user's request since it is not in compliance with the rules. That is, in an exemplary embodiment, if a request is made that is not in compliance with the rules, the request is not implemented. Alternatively, if the request is not in compliance with the rules, the request arbitrator 202 may implement an alternate change based on the non-compliant request. For example, if a user inputs a request that a humidity in a zone of a building, apartment, home or dwelling be set to 35 percent, and the rules input by the facility manager specify that the humidity stay within a range of 36 percent and 78 percent, the request arbitrator 202 may set the humidity to the compliant value closest to the user's non-compliant request (e.g., in the present example, the request arbitrator 202 may set the humidity to 36 percent). In this case, the request arbitrator 202 may generate a notification to be presented to the user, informing the user that his or her initial request was non-compliant, and informing the user that an adjustment was made based on the closest compliant value to the user's non-compliant request.

Figure 3:
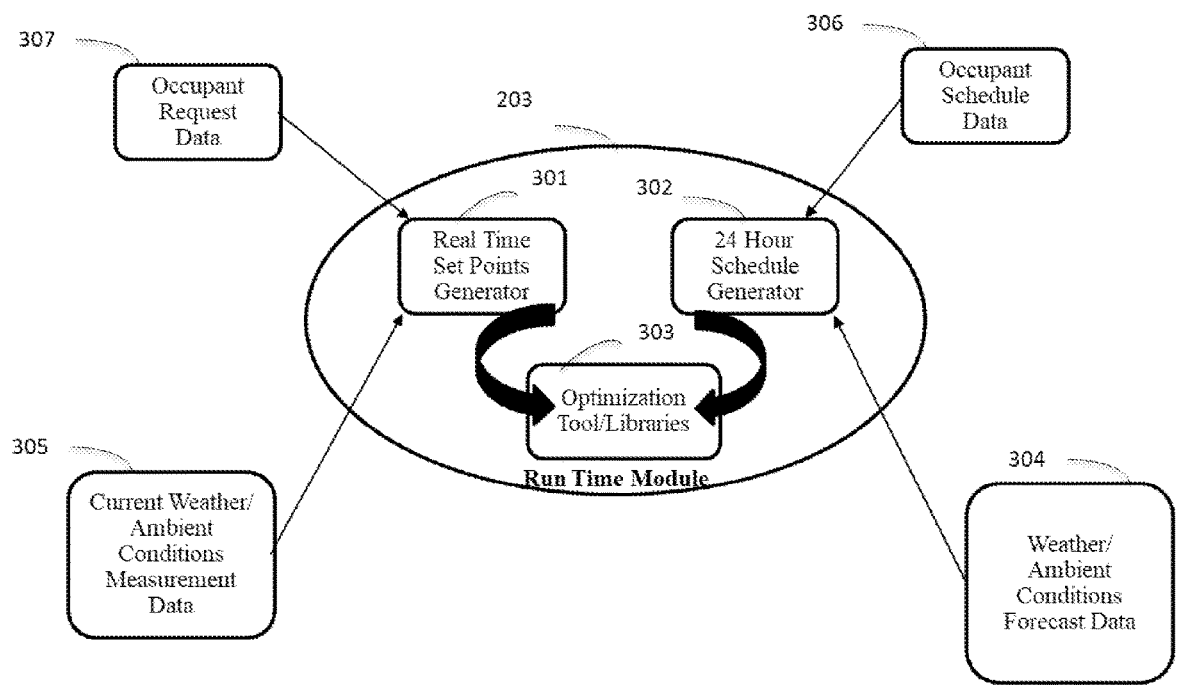
FIG. 3 shows the WMC run-time module of FIG. 2, according to an exemplary embodiment of the present disclosure.

FIG. 3 shows the WMC run-time module 203 of FIG. 2, according to an exemplary embodiment of the present disclosure.

The WMC run-time module 203 generates WMC strategies based on input received by the WMC system 100. As described above, the input may include, for example, weather data and/or external ambient climate data 102, occupancy data 103, and water price data 104. In an exemplary embodiment, the WMC run-time module 203 includes a default schedule generator 301, a real-time set-points generator 302, and an optimization tool/libraries module 303.

The default schedule generator 301 generates a default schedule including set-points for pre-determined intervals for every zone in the building, apartment, home or dwelling. The default schedule corresponds to an optimal schedule as determined by the default schedule generator 301. The default schedule generator 301 may be configured to generate a new schedule for any time interval. For example, the default schedule generator 301 may be configured to generate a new schedule every 24 hours, however the time interval is not limited thereto. Further, the pre-determined intervals for the set-points for every zone in the building, apartment, home or dwelling may be customized. For example, set-points for each zone may be set to update every hour, however the intervals are not limited thereto. In addition, the set-points for different zones and for different building, apartment, home or dwelling control devices may be set to update at different intervals. For example, the humidity in a first and second zone may be set to update every 1 hour, the humidity in a third zone may be set to update every 3 hours, the humidifying system in the first zone may be set to update every 8 hours, and the humidifying system in the second and third zones may be set to update every 12 hours.

The default schedule generated by the default schedule generator 301 is based on certain weather data and/or external ambient climate data 102 and certain occupancy data 103. For example, the weather data and/or external ambient climate data 102 may include both weather forecast data 304 and current (e.g., real-time) weather measurement data 305, and the occupancy data 103 may include both occupant schedule data 306 (e.g., predicted occupant schedules and tasks) and occupant request data 307 (e.g., current requests made by an occupant(s) in real-time). The default schedule generator 301 may utilize the weather forecast data 304 and the occupant schedule data 306 to generate the default schedule. The default schedule generator 301 receives the occupant schedule data 306 from the HMI 201. This schedule may be used by the FAS as the default schedule. For example, the default schedule generated by the default schedule generator 301 may be applied to the FAS when no new real-time set-points are provided by the real-time set-points generator 302.

The real-time set-points generator 302 generates set-points based on the real-time occupant request data 307 and the real-time weather measurement data 305. For example, as the real-time set-points generator 302 receives requests from an occupant or received from a system (or mobile application system) that stores and manages information on occupant and occupant schedule including but not limited to occupant travel plans outside the building, apartment, home or dwelling and receives real-time weather measurement data, the real-time set-points generator 302 generates set-points that override the default schedule generated by the default schedule generator 301. The WMC run-time module 203 may seamlessly transition between applying the default schedule to the FAS when no set-points have been generated by the real-time set points generator 302, and making adjustments to the default schedule when occupant requests and/or real-time weather measurement data is received.

The default schedule generator 301 and the real-time set-points generator 302 may both utilize the optimization tool/libraries module 303 and a water and/or humidity and/or air moisture simulator 204 of the water management controller 101 to perform optimization related simulation to determine optimal schedules and set-points. For example, the optimization tool/libraries module 303 may be utilized to perform different types of optimization, including, for example, heuristic search based optimization, and may utilize the water and/or humidity and/or air moisture simulator 204 to implement the optimization process.

Referring to FIG. 2, the water and/or humidity and/or air moisture simulator 204 simulates different WMC strategies and determines which strategy is the most water efficient. The water and/or humidity and/or air moisture simulator 204 may utilize existing water simulation software. The water and/or humidity and/or air moisture simulator 204 may communicate with the optimization tool/libraries module 303 of the WMC run-time module 203 to determine an optimized strategy. The water and/or humidity and/or air moisture simulator 204 may utilize characteristics of the building, apartment, home or dwelling, which may be input by a user (e.g., the facility manager), to simulate different WMC strategies. The building, apartment, home or dwelling characteristics may include, for example, the building, apartment, home or dwelling's physical makeup, including the physical makeup of specific rooms and zones, a description of the different types and locations of building, apartment, home or dwelling control devices in the building, apartment, home or dwelling, etc.

The interface module 205 is a channel allowing the outer loop to communicate with the inner loop. Once an WMC strategy is determined and selected by the WMC system 100 in the outer loop, this strategy is communicated to the inner loop, and the inner loop applies the strategy via local optimization of the building, apartment, home or dwelling control devices within the building, apartment, home or dwelling.

As described above, the WMC system 100 allows for the determination, simulation, and application of different WMC strategies, each of which may result in different water/cost savings. Various WMC strategies according to exemplary embodiments of the present disclosure, and corresponding simulation results, are described below. The WMC strategies may be compared to a baseline control strategy, in which a fixed schedule and fixed set-points are utilized at all times in the building, apartment, home or dwelling.

Figure 4:
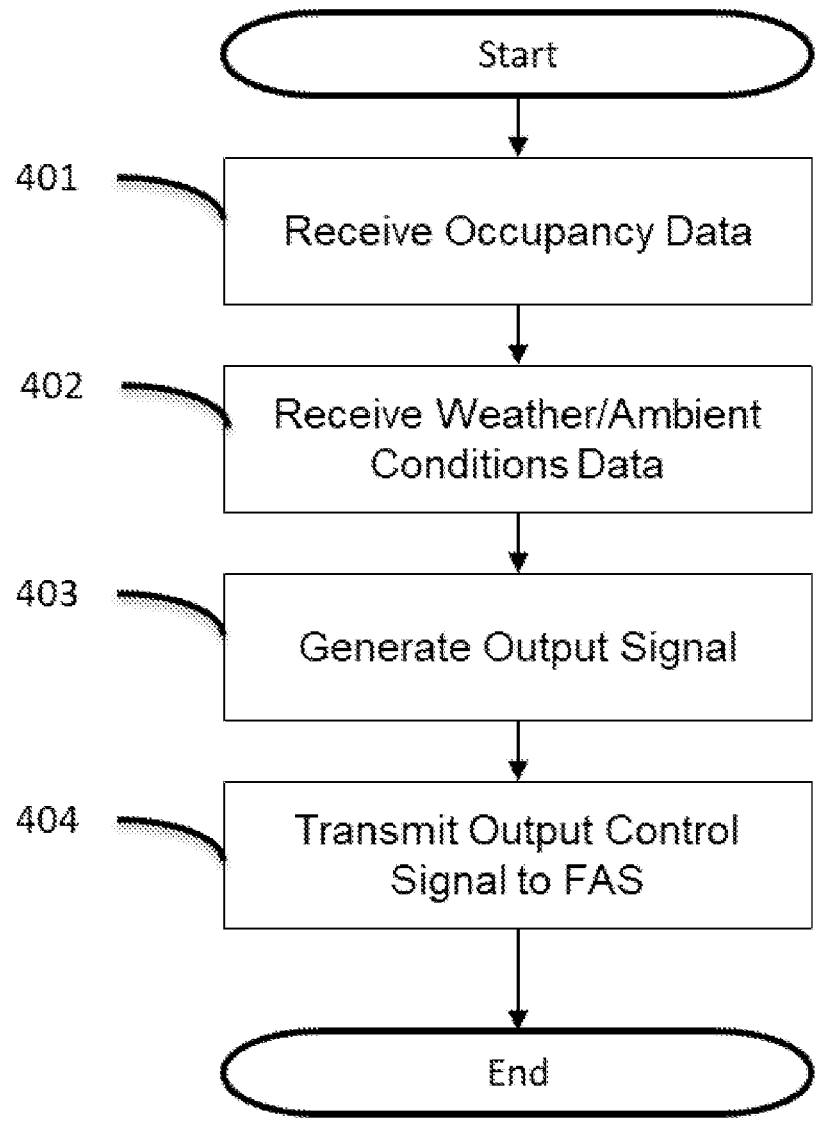
FIG. 4 is a flowchart showing a method of managing, monitoring and controlling water consumption in a building, apartment, home or dwelling, according to an exemplary embodiment of the present disclosure.

FIG. 4 is a flowchart showing a method of managing, monitoring and controlling water consumption in a building, apartment, home or dwelling, according to an exemplary embodiment of the present disclosure.

At block 401, occupancy data is received by the WMC system 100. The occupancy data may include occupant request data and/or occupant schedule data. As described above, the occupant request data may include a current request made by an occupant, and the occupant schedule data may include a predicted occupant schedule based on occupants in the building, apartment, home or dwelling and tasks to be completed in the building, apartment, home or dwelling. At block 402, weather data and/or external ambient climate data is received by the WMC system 100. As described above, the weather data and/or external ambient climate data may include current (e.g., real-time) weather measurement data and weather forecast data. At block 403, the WMC system 100 generates an output control signal. The output control signal is based on the received occupancy data and weather data and/or external ambient climate data, and is configured to adjust a building, apartment, home or dwelling control device in a zone in the building, apartment, home or dwelling. At block 404, the output control signal is transmitted to the FAS.

Figure 5:
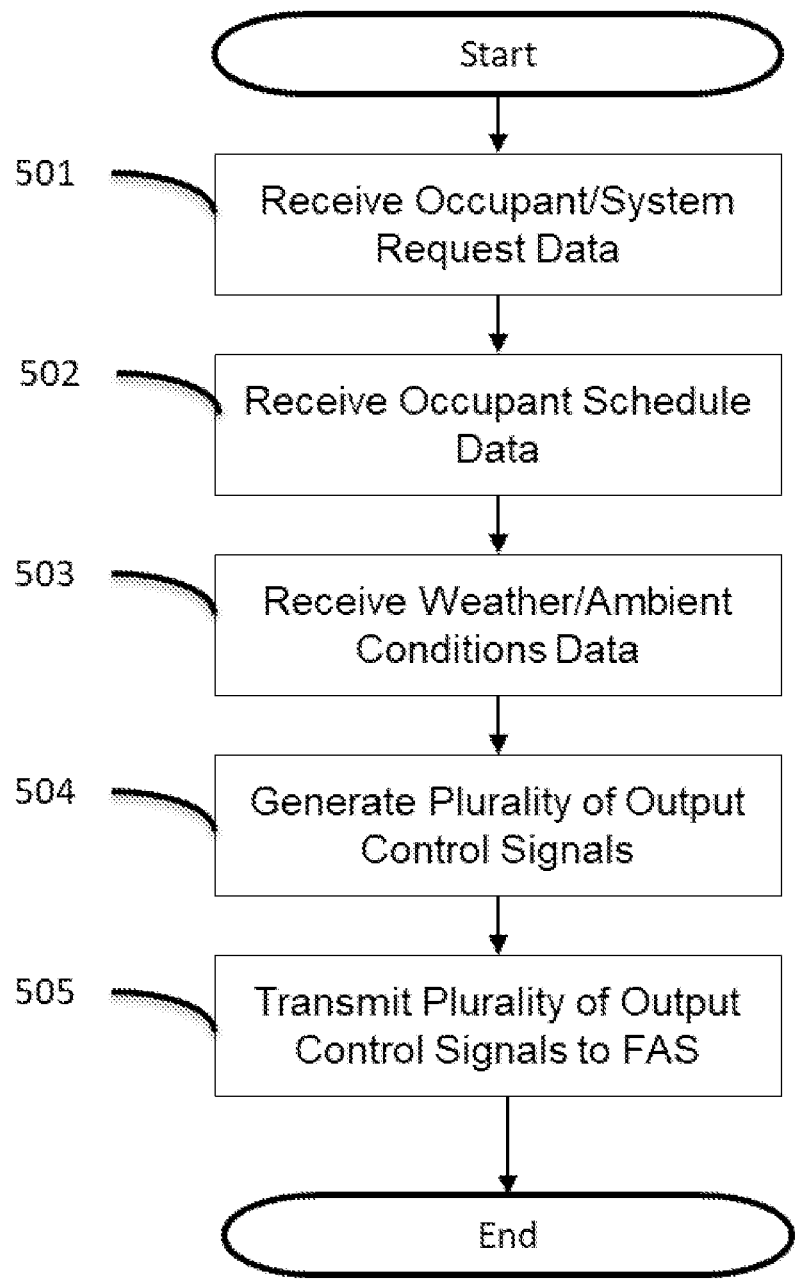
FIG. 5 is a flowchart showing a method of managing, monitoring and controlling water consumption in a building, apartment, home or dwelling, according to an exemplary embodiment of the present disclosure.

FIG. 5 is a flowchart showing a method of managing, monitoring and controlling water consumption in a building, apartment, home or dwelling, according to an exemplary embodiment of the present disclosure.

At block 501, occupant and/or system request data is received by the WMC system 100. The occupant request data may include a plurality of requests, each of which correspond to one of a plurality of zones in the building, apartment, home or dwelling. At block 502, occupant schedule data is received by the WMC system 100. The occupant schedule data may include a plurality of predicted occupant schedules, each of which corresponds to one of the plurality of zones in the building, apartment, home or dwelling. At block 503, weather data and/or external ambient climate data is received by the WMC system 100. The weather data and/or external ambient climate data may include current weather measurement data and/or weather forecast data. At block 504, a plurality of output control signals are generated by the WMC system 100. Each of the plurality of output control signals is based on one of the plurality of requests and one of the plurality of predicted occupant schedules, and each of the output control signals is configured to adjust building, apartment, home or dwelling control devices in the plurality of zones in the building, apartment, home or dwelling. At block 505, the output control signals are transmitted to the FAS. As a result, micro-zoning may be performed.

According to an exemplary embodiment, a time of day control strategy may be implemented by the WMC system 100. The time of day control strategy is based on a business hours schedule in which fixed set-points are utilized during business hours. For example, if typical business hours for a building, apartment, home or dwelling are defined as 9:00 am to 5:00 pm, fixed set-points increasing water use may be implemented at the start of the business day (e.g., 9:00 am), and fixed set-points decreasing water use may be implemented at the end of the business day (e.g., 5:00 pm). The time of day control strategy is not limited to business hours. For example, the time of day strategy may be utilized in a home setting using different, fixed set-points utilized during different hours (e.g., hours corresponding to the typical time occupants' are home).

According to an exemplary embodiment, an occupancy based control strategy may be implemented by the WMC system 100. The occupancy based control strategy is based on the occupancy data 103, and utilizing different set-points based on the occupancy data 103. For example, the occupancy data 103 may indicate an occupancy schedule, as well as occupancy requests/preferences. The occupancy schedule includes information indicating at which times different zones in the building, apartment, home or dwelling are typically occupied and unoccupied, and may also indicate the different tasks performed in the different zones at certain times. A zone may correspond to a single room in the building, apartment, home or dwelling, or to multiple rooms in a certain area of the building, apartment, home or dwelling. In addition to the occupancy schedule, occupancy requests/preferences may be included in the occupancy data 103. Occupancy requests/preferences include requests input to the WMC system 100 by user(s). For example, a user may request that a humidity of a certain zone be increased during certain times of day, or on different days. If this request complies with rules set by the facility manager, as described above, additional set-points may be implemented by the WMC system 100. For example, using the occupancy based control strategy, basic set-points may be initially implemented based on the occupancy schedule. Additional set-points may then be implemented based on occupant preferences and requests.

According to an exemplary embodiment, a knowledge based control strategy (e.g., an occupancy task based control strategy) may be implemented by the WMC system 100. The occupancy based control strategy is based on the occupancy data 103 received from a user(s). For example, the occupancy data 103 may indicate an occupancy schedule, as well as occupancy task information. The occupancy schedule includes information indicating at which times the building, apartment, home or dwelling is typically occupied and unoccupied. Further, the occupancy schedule may include information indicating at which times certain zones in the building, apartment, home or dwelling are typically occupied and unoccupied. A zone may correspond to a single room in the building, apartment, home or dwelling, or to multiple rooms in a certain area of the building, apartment, home or dwelling. In addition to the occupancy schedule, occupancy task information may be included in the occupancy data 103. Occupancy task information indicates specific tasks being carried out in specific zones of the building, apartment, home or dwelling. For example, tasks may indicate computer usage, laboratory usage, heavy reading, etc. Based on this information, set-points may be implemented to adjust the humidifying in specific zones of the building, apartment, home or dwelling based on the tasks being carried out in those zones.

According to an exemplary embodiment, a weather based control strategy may be implemented by the WMC system 100. The weather based control strategy is a supplemental control strategy that can supplement any of the control strategies according to exemplary embodiments of the present disclosure. For example, the weather based control strategy may be implemented together with any of the time of day control strategy, the occupancy based control strategy, and the knowledge based control strategy. When the weather based control strategy is utilized, the WMC system 100 receives weather data and/or external ambient climate data 102 as an additional input, and uses this additional data to implement set-points. As a result, the current weather can be leveraged to increase water consumption savings, as described above.

According to an exemplary embodiment, a water load shifting control strategy may be implemented by the WMC system 100. The water load shifting control strategy limits water consumption during peak water load time. Utilization of the water load shifting control strategy may result in the savings of water cost. That is, the water load shifting control strategy may reduce the total water cost by shifting the water load to a time period having a cheaper water price. For example, the water load shifting control strategy includes pre-humidifying or pre-dehumidifying zones of a building, apartment, home or dwelling prior to the peak water load time. A heuristic search based optimization process may be implemented to determine the optimal start time and the duration of the pre-humidifying or pre-dehumidifying. A water cost function may be defined as the sum of demand cost and water consumption cost. The heuristic search based optimization process may utilize, for example, Particle Swamp Optimization (PSO) or a Genetic Algorithm (GA).

It is to be understood that exemplary embodiments of the present disclosure may be implemented in various forms of hardware, software, firmware, special purpose processors, or a combination thereof. In one embodiment, a method for water management control may be implemented in software as an application program tangibly embodied on a computer readable storage medium or computer program product. As such, the application program is embodied on a non-transitory tangible media. The application program may be uploaded to, and executed by, a processor comprising any suitable architecture.

It should further be understood that any of the methods described herein can include an additional step of providing a system comprising distinct software modules embodied on a computer readable storage medium. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

Figure 6:
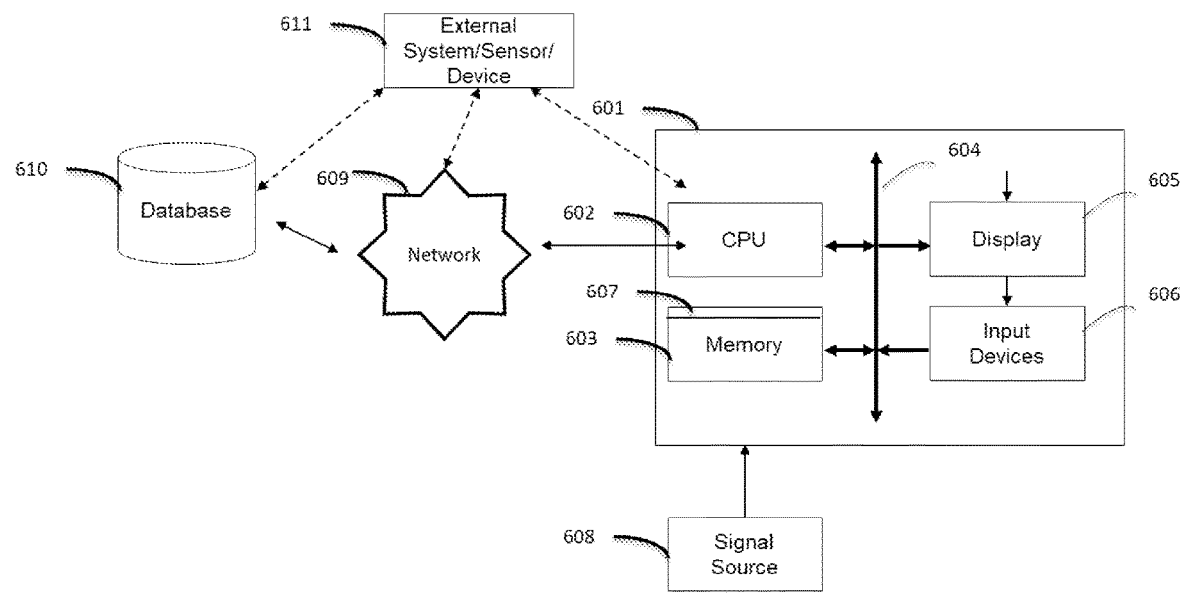
FIG. 6 shows an exemplary computer system for implementing an WMC system, according to an exemplary embodiment of the present invention.

Referring to FIG. 6, according to an exemplary embodiment of the present invention, a computer system 601 for water management control can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The computer system 601 can also be connected over a network 609 to a remote database 610, or connected over a network 609 to another external system and/or sensor and/or device 611 capable of sending and receiving instructions either directly or through the network 609 or to the remote database 610. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 36 07 that is stored in memory 603 and executed by the CPU 602 to process the signal from the signal source 608. As such, the computer system 601 is a general-purpose computer system that becomes a specific purpose computer system when executing the routine 36 07 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present invention.

Having described exemplary herein, it is noted that modifications and variations can be made by persons skilled in the art in light of the above teachings. It is therefore to be understood that changes may be made in exemplary embodiments of the disclosure, which are within the scope and spirit of the invention as defined by the appended claims. Having thus described the present disclosure with the details and particularity required by the patent laws, what is claimed and desired protected by Letters Patent is set forth in the appended claims.

What is claimed is:

1. A method of managing, monitoring and controlling water consumption in a building, apartment, home or dwelling, comprising: receiving occupancy data comprising at least one of occupant request data and occupant schedule data by a water management control (WMC) system, wherein the occupant request data comprises an initial request with corresponding initially requested environmental conditions received from an occupant of the building, apartment, home or dwelling or received from a system (or mobile application system) that stores and manages information on occupant and occupant schedule including but not limited to occupant travel plans outside the building, apartment, home or dwelling; and the occupant schedule data comprises a predicted occupant schedule; receiving weather data and/or external ambient climate data comprising at least one of current weather measurement data and weather forecast data by the WMC system (or weather forecast data from third party forecast systems); receiving a facility management rule or user defined management rule from a facility manager of the building, apartment, home or dwelling by the WMC system; generating an output control signal based on the occupancy data, and the weather data, the external ambient climate data, and the facility management rule or user defined management rule by the WMC system, wherein the output control signal is configured to adjust a building, apartment, home or dwelling control device in a zone in the building, apartment, home or dwelling; and transmitting the output control signal to a building, apartment, home or dwelling automation system (FAS) of the building, apartment, home or dwelling, determining, whether the initial request complies with the facility management rule or user defined management rule, wherein the output control signal causes the FAS to implement the initially requested environmental conditions when the initial request complies with the facility management rule or user defined management rule, and the output control signal causes the FAS to implement alternate environmental conditions different from the initially requested environmental conditions when the initial request does not comply with the facility management rule or user defined management rule, wherein the alternate environmental conditions are corresponding to a closest alternate request relative to the initial request and compliant with the facility management rule or user defined management rule, and wherein the WMC system comprises an WMC run-time module generating WMC strategies based on the occupancy data, the weather data and/or external ambient climate data and the facility management rule or user defined management rule received by the WMC system, wherein the WMC run-time module includes a default schedule generator, a real-time set-points generator and an optimization tool/libraries module, wherein the WMC run-time module seamlessly transitions between applying a default schedule generated by the default schedule generator to the FAS and adjusting the default schedule when real-time data generated by the real-time set-points generator is received, and wherein the default schedule generator and real-time set-points generator utilize the optimization tool/libraries module and a water and/or humidity and/or air moisture simulator to simulate the WMC strategies to determine an optimized WMC strategy, wherein characteristics of the building, apartment, home or dwelling are utilized to simulate the WMC strategies.

2. The method of claim 1, further comprising: receiving water price data comprising at least one of current water price data and predicted water price data, wherein generating the output control signal is further based on the water price data.

3. The method of claim 2, further comprising: determining a peak water load time based on the water price data, wherein the output control signal is further configured to pre-humidify or pre-dehumidify the building, apartment, home or dwelling during a time that does not correspond to the peak water load time.

4. The method of claim 1, wherein the zone corresponds to a room in the building, apartment, home or dwelling.

5. The method of claim 1, wherein the zone corresponds to an area in the building, apartment, home or dwelling including two or more rooms.

6. The method of claim 1, wherein the output control signal comprises a set-point corresponding to a target humidity and the building, apartment, home or dwelling control device is a humidity controlling thermostat.

7. The method of claim 1, wherein the output control signal comprises a set-point corresponding to a target humidity or air moisture content value and the building, apartment, home or dwelling control device is a humidifying system.

8. The method of claim 1, further comprising: setting a schedule for receiving at least one of the weather data, the external ambient climate data, occupancy data, the internal conditions (humidity, temperature, air quality and internal ambience) data, and the water price data.

9. The method of claim 1, wherein at least one of the weather data, the external ambient climate data, occupancy data, the internal conditions (humidity, temperature, air quality and internal ambience) data, the weather data, the external ambient climate data, and the water price data are received from a remote database or remote system capable of sensing data and transmitting data in real time (with or without need for storing data).

10. The method of claim 1, further comprising: transmitting a notification to the occupant of the building, apartment, home or dwelling upon the output control signal causing the FAS to implement the alternate environmental conditions different from the initially requested environmental conditions, wherein the notification indicates to the occupant that the alternate environmental conditions were implemented instead of the initially requested environmental conditions.

11. A method of managing, monitoring and controlling water consumption in a building, apartment, home or dwelling, comprising: receiving occupant request data comprising a plurality of initial requests from at least one occupant of the building, apartment, home or dwelling with a plurality of corresponding initially requested environmental conditions by a water management control (WMC) system, wherein each of the plurality of initial requests corresponds to one of a plurality of zones in the building, apartment, home or dwelling; receiving occupant schedule data comprising a plurality of predicted occupant schedules by the WMC system, wherein each of the plurality of predicted occupant schedules corresponds to one of the plurality of zones in the building, apartment, home or dwelling; receiving weather data and/or external ambient climate data comprising at least one of current weather measurement data and weather forecast data; receiving a facility management rule or user defined management rule from a facility manager by the WMC system the building, apartment, home or dwelling; generating a plurality of output control signals by the WMC system, wherein each of the plurality of output control signals is based on one of the plurality of initial requests, and one of the plurality of predicted occupant schedules, and the facility management rule or user defined management rule, and each of the plurality of output control signals is configured to adjust building, apartment, home or dwelling control devices in the plurality of zones in the building, apartment, home or dwelling; and transmitting the output control signal to a building, apartment, home or dwelling automation system (FAS) of the building, apartment, home or dwelling, determining, whether the plurality of initial requests complies with the facility management rule or user defined management rule, wherein the plurality of output control signals causes the FAS to implement the plurality of initially requested environmental conditions, when the plurality of initial requests complies with the facility management rule or user defined management rule, and the plurality of output control signal causes the FAS to implement a plurality of alternate environmental conditions different from the plurality of initially requested environmental conditions, when the plurality of initial requests does not comply with the facility management rule or user defined management rule, wherein the plurality of alternate environmental conditions are corresponding to a plurality of closest alternate requests relative to the plurality of initial requests and compliant with the facility management rule or user defined management rule, and wherein the WMC system comprises an WMC run-time module generating WMC strategies based on the occupancy data, the weather data and/or external ambient climate data and the facility management rule or user defined management rule received by the WMC system, wherein the WMC run-time module includes a default schedule generator, a real-time set-points generator and an optimization tool/libraries module, wherein the WMC run-time module seamlessly transitions between applying a default schedule generated by the default schedule generator to the FAS and adjusting the default schedule when real-time data generated by the real-time set-points generator is received, and wherein the default schedule generator and real-time set-points generator utilize the optimization tool/libraries module and a water and/or humidity and/or air moisture simulator to simulate the WMC strategies to determine an optimized WMC strategy, wherein characteristics of the building, apartment, home or dwelling are utilized to simulate the WMC strategies.

12. The method of claim 11, further comprising: receiving water price data comprising at least one of current water price data and predicted water price data, wherein generating the plurality of output control signals is further based on the water price data.

13. The method of claim 12, further comprising: determining a peak water load time based on the water price data, wherein the output control signals are configured to pre-humidify or pre-dehumidify at least one of the plurality of zones in the building, apartment, home or dwelling during a time that does not correspond to the peak water load time.

14. The method of claim 11, further comprising: transmitting at least one notification to the at least one occupant of the building, apartment, home or dwelling upon the plurality of output control signals causing the FAS to implement the plurality of alternate environmental conditions different from the plurality of initially requested, wherein the at least one notification indicates to the at least one occupant that the alternate environmental conditions were implemented instead of the initially requested environmental conditions.

15. A water management controller or computer program product, comprising: a run-time module configured to receive occupant schedule data comprising a predicted occupant schedule, and weather data and/or external ambient climate data comprising at least one of current weather measurement data and weather forecast data; a human-machine interface (HMI) configured to receive occupant request data comprising an initial request with corresponding initially requested environmental conditions received from an occupant of a building, apartment, home or dwelling or received from a system (or mobile application system) that stores and manages information on occupant and occupant schedule including but not limited to occupant travel plans outside the building, apartment, home or dwelling, and a facility management rule or user defined management rule from a facility manager of the building, apartment, home or dwelling; and an interface module configured to receive an output control signal from the run-time module and transmit the output control signal to a building, apartment, home or dwelling automation system (FAS) of the building, apartment, home or dwelling, wherein the output control signal is based on the occupant schedule data, the weather data, the external ambient climate data, the occupant request data, and the facility management rule or user defined management rule, and the output control signal is configured to adjust a building, apartment, home or dwelling control device in a zone in the building, apartment, home or dwelling, wherein the output control signal causes the FAS to implement the initially requested environmental conditions when the initial request complies with the facility management rule or user defined management rule, and the output control signal causes the FAS to implement alternate environmental conditions different from the initially requested environmental conditions when the initial request does not comply with the facility management rule or user defined management rule, wherein the alternate environmental conditions are corresponding to a closest alternate request relative to the initial request and compliant with the facility management rule or user defined management rule, and wherein the run-time module generates strategies based on the occupant schedule data, the weather data, the external ambient climate data, the occupant request data and the facility management rule or user defined management rule, wherein the run-time module includes a default schedule generator, a real-time set-points generator and an optimization tool/libraries module, wherein the run-time module seamlessly transitions between applying a default schedule generated by the default schedule generator to the FAS and adjusting the default schedule when real-time data generated by the real-time set-points generator is received, and wherein the default schedule generator and real-time set-points generator utilize the optimization tool/libraries module and a water and/or humidity and/or air moisture simulator to simulate the strategies to determine an optimized strategy, wherein characteristics of the building, apartment, home or dwelling are utilized to simulate the strategies.

16. The water management controller of claim 15, wherein the run-time module is further configured to receive water price data comprising at least one of current water price data and predicted water price data, and the output control signal is further based on the water price data.

17. The water management controller of claim 16, wherein the run-time module is further configured to determine a peak water load time based on the water price data, and the output control signal is further configured to pre-humidify or pre-dehumidify the zone in the building, apartment, home or dwelling during a time that does not correspond to the peak water load time.

18. The water management controller of claim 15, wherein the HMI is further configured to receive a notification upon the output control signal causing the FAS to implement the alternate environmental conditions different from the initially requested environmental conditions, wherein the notification indicates to the occupant of the building, apartment, home or dwelling that the alternate environmental conditions were implemented instead of the initially requested environmental conditions.

* * * * *